UNITED STATES PATENT OFFICE 2,500,822

THENALDIMINES

Howard D. Hartough, Pitman, and John W. Schick, Camden, N. J., assignors to Socony-Vacuum Oil Company, Incorporated, a corporation of New York No Drawing. Application February 27, 1947, Serial No. 731,410

8 Claims. (Cl. 260—329)

The present invention relates to the production of thenaldimines and the conversion of thenaldimines into thiophenealdehyde and amines.

Complex sub-resinous polymeric thenaldimines can be obtained by reacting thiophene, hydroxylamine hydrochloride and formaldehyde in equimolecular proportions at temperatures of about 30 to about 75 degrees centigrade. The thenaldimines are recovered by treating the reaction mixture with an aqueous solution of alkali metal or alkaline earth metal hydroxide to free the imines as an oily liquid layer, dissolving the oily layer in benezene and evaporating the benzene to leave a light yellow viscous oil comprising complex thenaldimines.

Upon hydrolyzing the complex thenaldimines so obtained with dilute mineral acid such as dilute hydrogen halide, dilute sulfuric acid, dilute phosphoric acid, dilute nitric acid and the like, thiophenealdehyde is produced together with a complex amine.

It is also possible to obtain N-(2-thenyl)-2-thenaldimine by treating di-(2-thenyl) hydroxylamine. On the other hand, when the thiophene nuclei of di-(2-thenyl) hydroxylamine have 1 to 3 substituent groups, which substituent groups are electropositive substituents such as alkyl, aryl, halo, aryloxy and alkoxy groups, the corresponding derivative of N-(2-thenyl)-2'-thenaldimine is obtained. Thus, the reaction of methylthiophene with formaldehyde and hydroxylamine hydrochloride produces di-2-(methylthenyl) hydroxylamine which may be converted into N-(methyl - 2 - thenyl) - 2'- (methylthenaldimine). On the other hand, when substituted hydroxylamine salts are employed, such as phenylhydroxylamine methylhydroxylamine or, in general, arylhydroxylamines or alkylhydroxylamines, alkyl or arylthenylhydroxylamine is obtained which may be converted into N-(thenyl)-2'-alkyl or arylimine. In general, the nature of the products produced by the method to be described hereinafter is represented by the following formula:

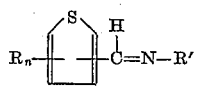

where

R is an electropositive substituent,

R' is hydrogen, a thenyl group, a thenyl group having 1 to 3 electropositive substituents, a phenyl or substituted phenyl group, alkyl group or cycloalkyl group, and $n$ is an integer not greater than 3.

Thus, the compounds corresponding to the formulae set forth hereinafter are within the scope of the present invention.

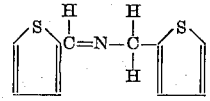

I

N-(2-thenyl)-2'-thenaldimine

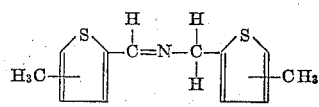

II

N-[(methyl-2-thenyl)-2'-(methylthenaldimine)]

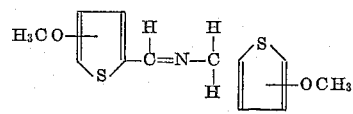

IIa

N-2-(methoxythenyl)-2'-(methoxythenaldimine)

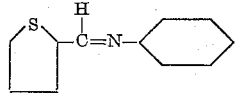 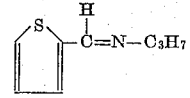

III                      IV

N-phenyl-2-thenaldimine     N-propyl-2-thenaldimine

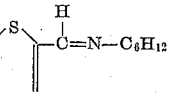 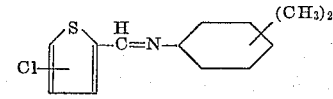

V                        VI

N-cyclohexyl-2-thenaldimine     N-xylyl-2-(chlorothenaldimine)

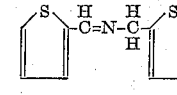

or

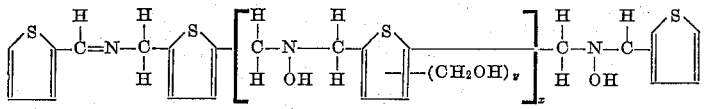

where $x$ = a small integer (1–5)

$y$ = 0 to $x$ or

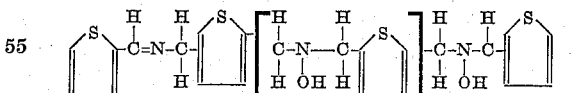

VII

Polymeric thenaldimines

The preparation of aldimines having at least one thenyl group generally involves preparation of a thenyl hydroxylamine derivative, preparation of the salt of an organic acid thereof and pyrolysis of the salt at temperatures of about 130 to about 200 degrees centigrade. The organic acids which are used are the lower aliphatic acids, i. e. acetic, propionic, butyric, etc. or, in general, the aliphatic carboxylic acids having two to seven carbon atoms. The pyrolysis of the salt is carried out preferably at about 150 to about 160 degrees centigrade.

For example, about one mole of di-(2-thenyl) hydroxylamine is dissolved in a suitable solvent therefor, say benzene, and cooled to about zero to about 5 degrees centigrade. The cooled benzene solution is added slowly to about 1.5 moles of aliphatic carboxylic anhydride such as acetic anhydride. The mixture is refluxed for about 2.5 to about 3.5 hours on a steam bath, cooled, water washed and then washed with a mildly alkaline aqueous solution until neutral. The use of aqueous ten per cent sodium carbonate solution has given satisfactory results. The neutral solution is then topped to remove the benzene and the crude organic salt of the substituted hydroxylamine subjected to distillation under a vacuum. For the acetate of di-(2-thenyl) hydroxylamine a pressure of 4 millimeters has been found satisfactory. When the temperature of the fatty acid salt of the substituted hydroxylamine reaches that at which the fatty acid salt decomposes the anhydride of the fatty acid of the salt together with thiophenealdehyde distills. For the acetate, acetic anhydride and thiophenealdehyde begin to distill at about 150 to 160 degrees centigrade. Employing the proportions set forth hereinbefore, i. e. about 1 mole of di-(2-thenyl) hydroxylamine and about 1.5 moles acetic anhydride, about 0.6 mole of acetic anhydride is recovered together with about 0.07 mole of thiophenealdehyde which probably is formed by alkaline hydrolysis of the imine during the neutralization of the acetate solution. When pyrolysis is complete about 0.4 mole of N-(2-thenyl)-2'-thenaldimine is recovered. The thenaldimine has a boiling point at 4 millimeters of mercury pressure of 157 to 158 degrees centigrade. The still residue amounts to about 103 parts by weight and is a red polymeric oil. The distillate slowly crystallized and after two recrystallizations from A. S. T. M. naphtha melted at 55.5 to 56.5 degrees centigrade.

N-(2-thenyl)-2'-thenaldimine has the empirical formula, $C_{10}H_9NS_2$ and a calculated nitrogen content of 6.71 per cent. The aldimine prepared as described hereinbefore was analyzed for nitrogen and found to contain 6.65 per cent nitrogen.

The existence of the —HC=N— group in the material prepared from di-(2-thenyl) hydroxylamine was established in the following manner:

Two hundred milliliters of 2 normal aqueous hydrochloric acid solution was added to 30 grams of the material having a melting point of 55.5 to 56.5 degrees centigrade and the mixture steam distilled. The distillate was extracted with ethyl ether and the ether removed from the extract. The residue after the evaporation of the ether amounted to 11 grams of material identified through the semicarbazone as 2-thiophenealdehyde. The semicarbazone melted at 218 to 219 degrees centigrade (uncorrected). (A melting point of 227 to 228 degrees centigrade for the semicarbazone is reported in the literature.)

Calculated for $C_6H_7N_3OS$, 24.74% nitrogen
Found, 24.93% nitrogen

The conversion of 30 grams of N-(2-thenyl)-2'-thenaldimine to 11 grams of 2-thiophenealdehyde is a 68 per cent yield of the theoretical amount obtainable.

The residue left from the steam distillation of the acid hydrolysis of N-(2-thenyl)-2'-thenaldimine was extracted with benzene. Six grams of an unidentified dark red tar was removed. The aqueous layer was neutralized with potassium hydroxide and extracted with ethyl ether. Subsequent evaporation of the ether produced 15.5 grams of 2-thenylamine (95 per cent yield). The 2-thenylamine was identified by conversion to the N,N'-(2-thenyl) phenylthiourea by reacting it with phenylisothiocyanate in accordance with standard procedures. After two recrystallizations from 75 per cent aqueous ethanol the conversion product melted at 123.5 to 124.5 degrees centigrade. The mixed melting point with an authentic sample having a melting point of 124 to 124.5 degrees centigrade was determined to be 123.5 to 124.5 degrees centigrade.

From the foregoing those skilled in the art will understand that the conversion of di-(2-thenyl)-hydroxylamine probably takes place in accordance with the following equations:

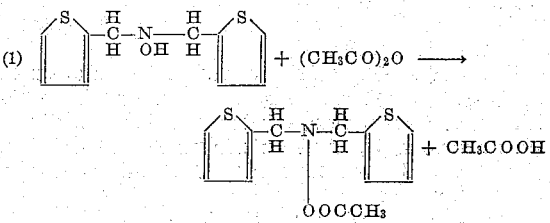

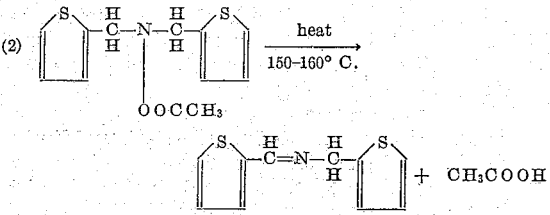

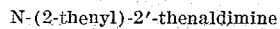

N-(2-thenyl)-2'-thenaldimine

The hydrolysis of the thenaldimine to 2-thiophenealdehyde and 2-thenylamine probably is represented by the following equation:

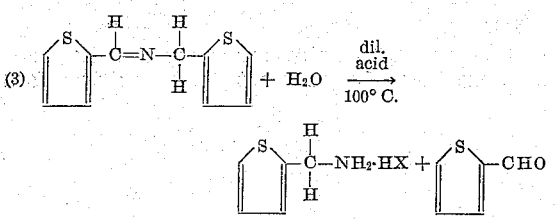

Therefore, in general the process of the present invention may be represented by the following generic equations:

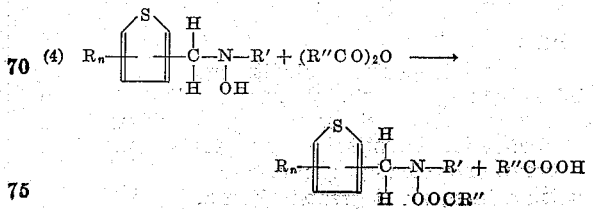

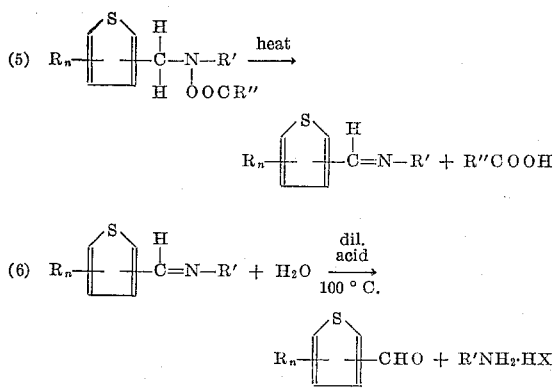

where

R is an electropositive substituent

R' is hydrogen, a thenyl group, a thenyl group having 1 to 3 substituent groups, a phenyl or substituted phenyl group, alkyl group or cycloalkyl group, R'' is an alkyl group, $n$ is an integer not greater than 3, and HX is a mineral acid.

The charge stock for the preparation of the aldimines described hereinbefore is obtained by reacting thiophene or a thiophene derivative having 1 to 3 electropositive substituent groups with formaldehyde or its polymers and a salt of hydroxylamine or N-substituted hydroxylamine as described in the copending application Serial No. 670,031, filed May 15, 1946, in the names of Howard D. Hartough and Everett H. Murray, Jr. The products obtained are N-substituted hydroxylamines having at least one thenyl group. The N-substituted hydroxylamines when converted into a lower fatty acid salt thereof and pyrolyzed are converted into the corresponding aldimines.

It has been found that 2-thenaldimine inhibits the formation of sludge as determined by the bubble test. As those skilled in the art know, the bubble test is performed as described in U. S. Patent No. 2,361,353. A section of a bearing having a cadmium-silver alloy surface and weighing about 6 grams is placed in about 30 grams of oil and sections of similar bearings are placed in 30 grams of the same oil containing different amounts of the additive to be tested. The samples of oil and blends are heated at 175 degrees centigrade for twenty-two hours while a stream of oil is bubbled against the surface of the bearing. The loss in weight in milligrams of the bearing is indicative of the corrosiveness of the oil and the oil blends. The difference between the loss in weight in milligrams of the bearing in the control oil and in the blend is indicative of the protection against corrosiveness provided by the additive. 2-thenaldimine was dissolved in solvent refined oil of S. A. E. 20 grade to provide a saturated solution of the additive containing less than about 1 per cent of 2-thenaldimine. When tested as described above in comparison with a control oil containing no additive and comprising solvent refined oil of S. A. E. 20 grade, the bearing section tested in the blend containing less than 1 per cent of 2-thenaldimine (saturated solution) suffered a loss of 1 milligram. In the same period of time a similar bearing section immersed in the blank oil containing no additive suffered a 17 milligrams loss.

We claim:

1. A method for preparing aldimines which comprises subjecting an N-thenyl hydroxylamine salt of an aliphatic carboxylic acid having 2 to 7 carbon atoms in the molecule to elevated temperatures and recovering the corresponding aldimine.

2. A method for preparing N-(2-thenyl)-2'-thenaldimine which comprises subjecting the di-(2-thenyl) hydroxylamine salt of an aliphatic carboxylic acid having 2 to 7 carbon atoms to elevated temperatures and recovering N-(2-thenyl)-2'-thenaldimine.

3. A method for preparing aldimines which comprises subjecting the acetate of an N-thenyl hydroxylamine to elevated temperatures and recovering the corresponding aldimine.

4. A method for preparing N-(2-thenyl)-2'-thenaldimine which comprises subjecting the acetate of di-(2-thenyl) hydroxylamine to elevated temperatures and recovering N-(2-thenyl)-2'-thenaldimine.

5. A new composition of matter N-(2-thenyl)-2'-thenaldimine boiling at 157 to 158° C. at a pressure of 4 millimeters of mercury and having a melting point of 55.5 to 56.5° C.

6. A method for preparing aldimines which comprises subjecting an N-thenyl hydroxylamine salt of an aliphatic carboxylic acid having 2 to 7 carbon atoms in the molecule to distillation under vacuum to obtain a first distillate comprising the anhydride of the carboxylic acid of said hydroxylamine salt and an aldehyde of the N-substituent of said hydroxylamine salt and continuing said distillation under vacuum to obtain a second distillate comprising the corresponding formaldimine.

7. A method for preparing N-(2-thenyl)-2'-thenaldimine which comprises subjecting the acetate of di-(2-thenyl) hydroxylamine to distillation under a vacuum to obtain a first distillate comprising acetic anhydride and thiopheneealdehyde, and continuing the distillation under a vacuum to obtain a second distillate comprising N-(2-thenyl)-2'-thenaldimine.

8. A new composition of matter comprising an N-thenylaldimine.

HOWARD D. HARTOUGH.
JOHN W. SCHICK.

REFERENCES CITED

The following references are of record in the file of this patent:

UNITED STATES PATENTS

| Number | Name | Date |
|---|---|---|
| 2,160,293 | Shoemaker et al. | May 30, 1939 |
| 2,161,808 | Finlayson | June 13, 1939 |
| 2,367,702 | Van Zoeren | Jan. 23, 1945 |

OTHER REFERENCES

Holdren, J. Am. Chem. Soc., 68, 1198–1200 (1946).

Hartough, J. Am. Chem. Soc., 69, 1355-8 (1947).